United States Patent [19]

Keijzer et al.

[11] 3,960,385
[45] June 1, 1976

[54] LEVELING SYSTEM

[75] Inventors: Johan H. Keijzer, Hasselt; Willy R. J. Pierle, Tienen; G. Van de Voorde, Sint-Martent-Latem, all of Belgium

[73] Assignee: Monroe Belgium N.V., Sint-Truiden, Belgium

[22] Filed: Oct. 24, 1974

[21] Appl. No.: 517,606

Related U.S. Application Data

[62] Division of Ser. No. 261,608, June 12, 1972, Pat. No. 3,847,410.

[52] U.S. Cl. ............................... 280/692; 280/64
[51] Int. Cl.² .......................................... B60G 11/26
[58] Field of Search .................... 280/124 F, 124 R; 267/64 R, 64 A, 64 B; 188/313, 318

[56] References Cited
UNITED STATES PATENTS

| | | | |
|---|---|---|---|
| 3,059,915 | 10/1962 | Kemelchor | 267/64 A |
| 3,128,088 | 4/1964 | Paschakarnis | 280/124 F |
| 3,810,650 | 5/1974 | Hudson | 280/124 F |
| 3,820,818 | 6/1974 | Kress | 267/64 R |
| 3,853,311 | 12/1974 | Kreuzer | 267/64 R |
| 3,854,710 | 12/1974 | Nicholls | 280/124 F |
| 3,865,135 | 2/1975 | McWilliams | 267/64 R |
| 3,869,861 | 3/1975 | Case | 280/124 F |
| 3,876,227 | 4/1975 | Aikawa | 280/124 F |

*Primary Examiner*—Philip Goodman
*Assistant Examiner*—John A. Carroll
*Attorney, Agent, or Firm*—Harness, Dickey & Pierce

[57] ABSTRACT

A leveling system for controlling the relative attitude between the sprung and unsprung portions of the vehicle, which includes at least one leveling strut comprising a cylinder connected at one end to one of the vehicle portions, a valved piston reciprocally mounted within the cylinder, a piston rod connected to the piston and projecting from one end of the cylinder and adapted for connection to the other end of the vehicle portions, a quantity of damping fluid within the cylinder for damping reciprocal movement of the piston, means defining a gas chamber containing a quantity of gas, a partition for separating the gas from the damping fluid, and means for varying the pressure of the gas in order to control the relative attitude between the sprung and unsprung portions of the vehicle.

32 Claims, 10 Drawing Figures

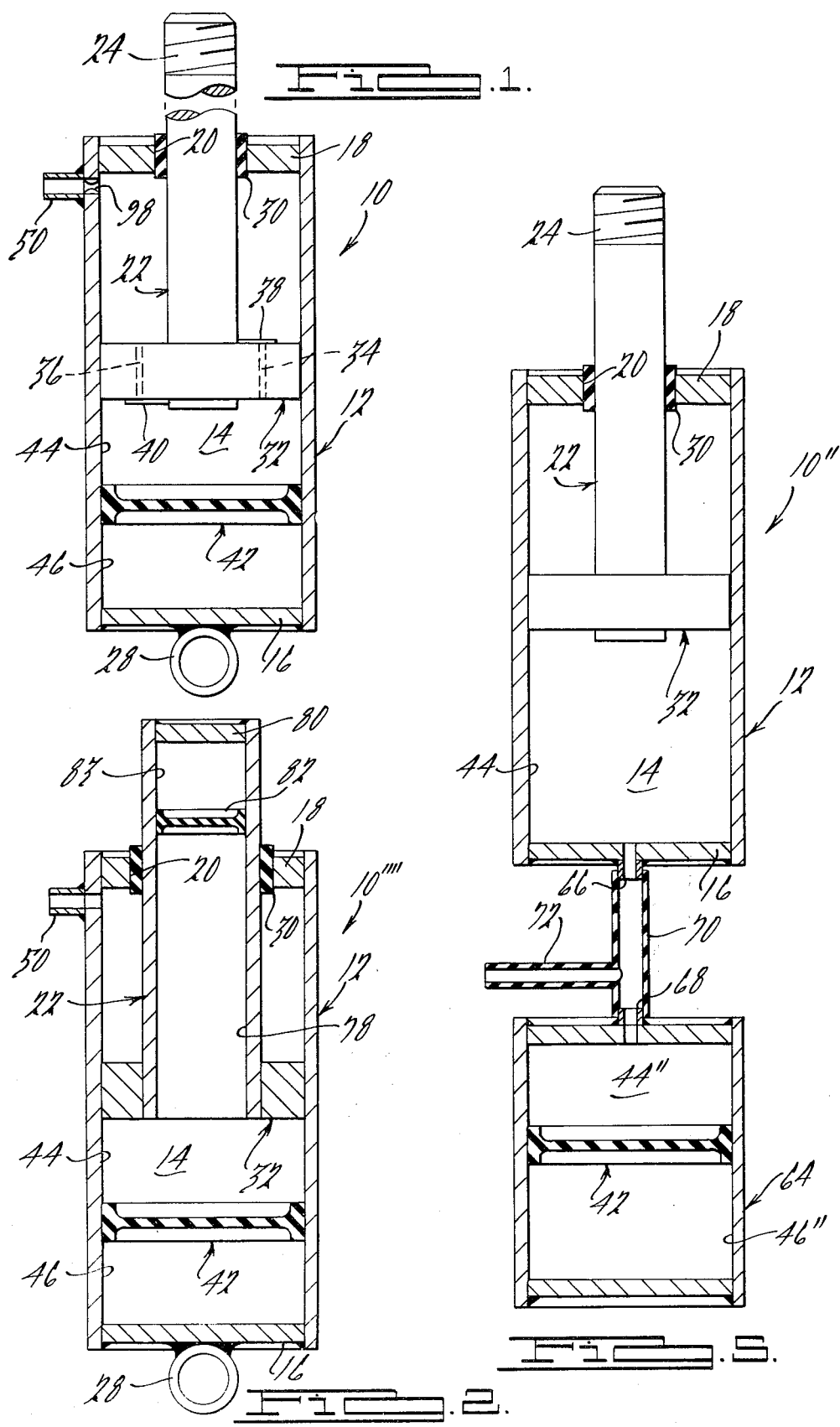

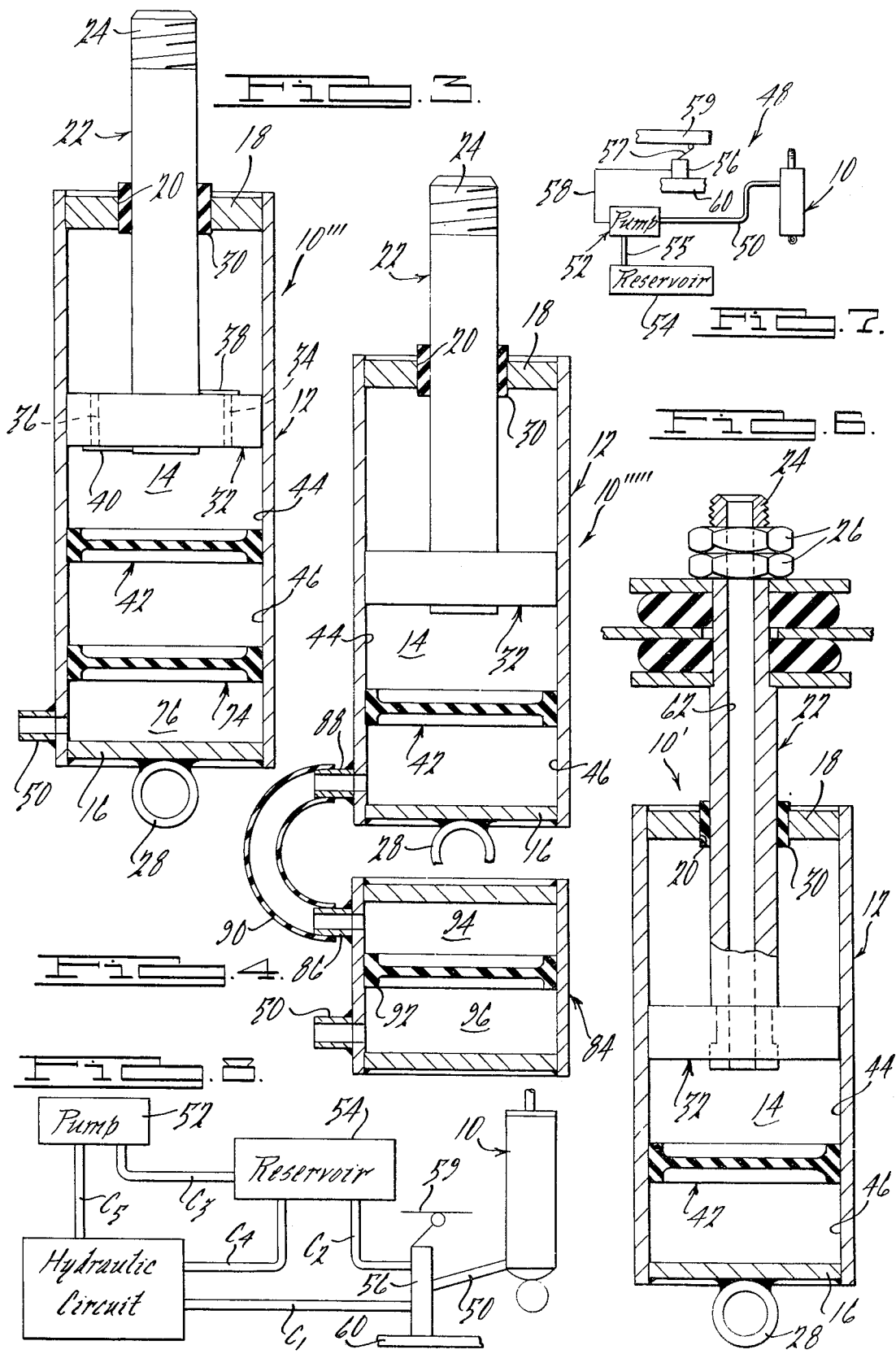

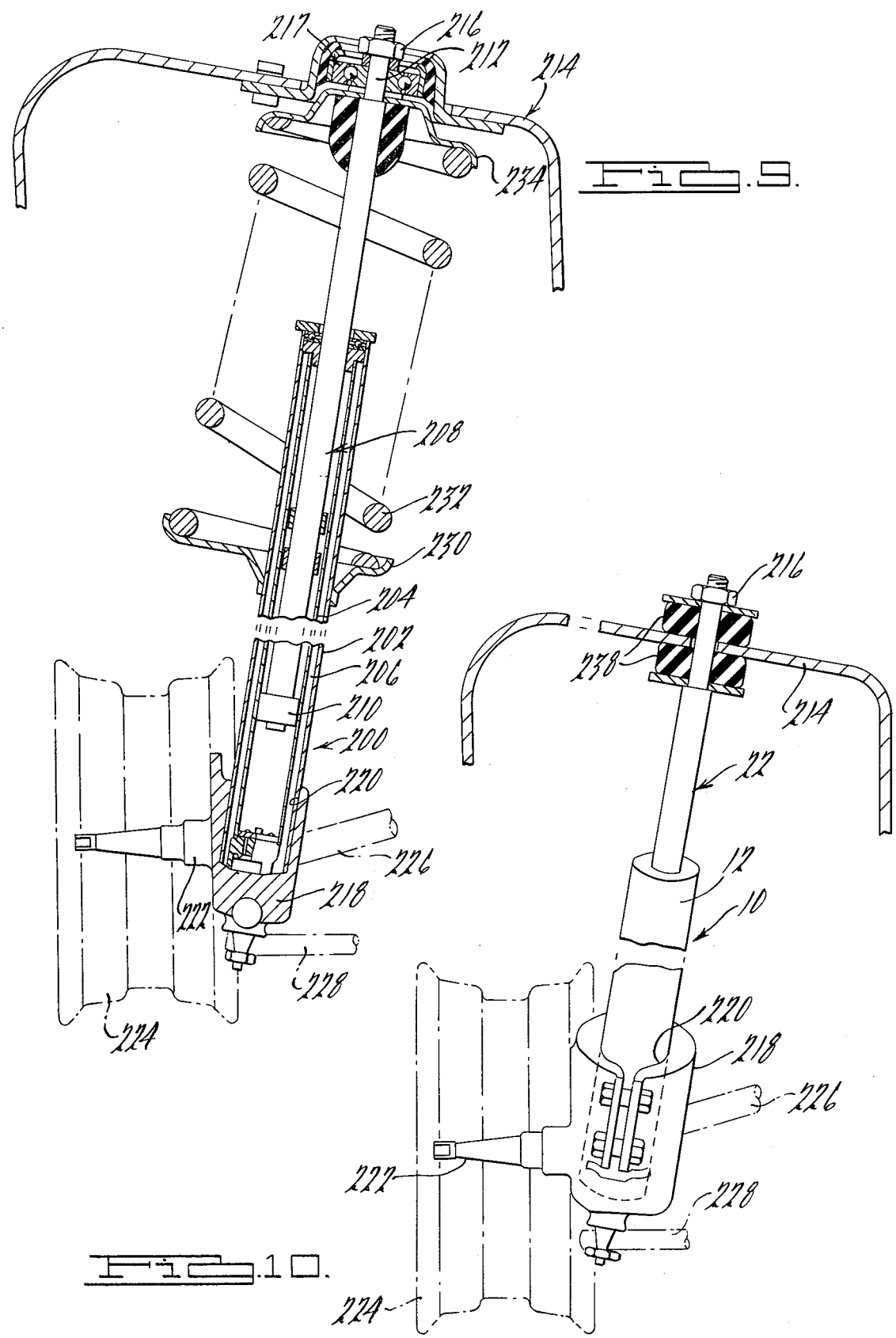

LEVELING SYSTEM

This is a division of Ser. No. 261,608, filed June 12, 1972 now U.S. Pat. No. 3,847,410.

SUMMARY OF THE INVENTION

Generally speaking, the present invention is directed toward a new and improved method and apparatus for controlling the attitude between the sprung and unsprung portions of a vehicle. More particularly, the present invention is directed toward a hydraulic leveling system which is operable to maintain the sprung portion of a vehicle level under all loading conditions and which is also operable to replace the normal shock absorbers which are conventionally installed on modern automotive vehicles.

It is accordingly a general object of the present invention to provide a new and improved leveling system.

It is a more particular object of the present invention to provide a new and improved combination leveling system and vehicular shock absorber system.

It is still a more particular object of the present invention to provide a new and improved leveling system which comprises at least one vehicle leveling strut that contains preselected quantities of a damping fluid and a compressible gas and which includes means for varying the pressure of the gas in order to control the attitude of the sprung portion relative to the unsprung portion of an associated vehicle.

It is a further object of the present invention to provide a new and improved leveling system which is particularly adapted for substitution in vehicular applications of McPherson type shock absorbers and the like.

It is another object of the present invention to provide a new and improved vehicular shock absorber, as above described, which is of a relatively simple design, is economical to manufacture and maintain, and which will have a long and effective operational life.

Other objects and advantages of the present invention will become apparent from the following detailed description taken in conjunction with the accompanying drawings.

BRIEF DESCRIPTION OF THE DRAWINGS

FIG. 1 is a schematic representation of one preferred embodiment of a leveling strut in accordance with the principals of the present invention;

FIG. 2 is a schematic representation of an alternate embodiment of the leveling strut shown in FIG. 1;

FIG. 3 is a schematic representation of still another embodiment of the leveling strut illustrated in FIG. 1;

FIG. 4 is a schematic representation of yet another embodiment of the leveling strut of the present invention;

FIG. 5 is a schematic representation of still a further embodiment of the leveling strut in accordance with the principles of the present invention;

FIG. 6 is a schematic representation of yet another embodiment of the leveling strut of the present invention;

FIG. 7 is a schematic representation of a typical leveling system in accordance with the principles of the present invention;

FIG. 8 is another schematic representation of a typical leveling system in accordance with the present invention;

FIG. 9 is a schematic representation of a typical installation of a McPherson type shock absorber unit which is adapted to be replaced by the leveling system of the present invention, and FIG. 10 is an elevated perspective view of one embodiment of the leveling system of the present invention as shown in operative association with the mounting structure for a McPherson type shock absorber unit shown in FIG. 9.

DETAILED DESCRIPTION OF THE PREFERRED EMBODIMENT

Referring now in detail to FIG. 1, a vehicle leveling unit or strut 10, in accordance with one preferred embodiment of the present invention, is shown generally as comprising a cylindrical housing or enclosure 12 which defines an internal volume or chamber 14. The opposite ends of the enclosure 12 are closed by end header members 16 and 18 which may be secured to the enclosure 12, as by welding or the like. The end header member 18 is formed with a central annular bore 20 through which one end of an elongated cylindrical piston rod 22 is slidably received. The outer end of the piston rod 22 is provided with an externally threaded end portion 24 which is adapted to be secured, for example, by suitable nuts or the like (see FIG. 6) to either the sprung or unsprung portion of the associated vehicle. A suitable attachment ring 28 is fixedly secured, as by welding or the like, to the end member 16 and is adapted to be secured to the other of the sprung or unsprung vehicle portions, whereby the unit 10 will be operatively mounted in a position normally assumed by a vehicular shock abscrber, as will hereinafter be described in detail. A suitable fluid seal 30 is interposed between the inner periphery of the bore 20 and the outer periphery of the piston rod 22 to provide against any fluid leakage therebetween. It will be appreciated, of course, that the attachment ring 28 and end portion 24 could be interchanged, or various alternative means well known in the art could be utilized for operatively mounting the strut 10.

The inner end of the piston rod 22 is operatively secured to a reciprocable piston 32 which is provided with fluid passages 34 and 36 that constitute valve ports cooperable with valve elements 38 and 40 for controlling the flow of a hydraulic damping fluid, such as oil or the like, as the piston 32 and piston rod 22 move upwardly and downwardly within the enclosure 12. By virtue of the fact that the passages 34, 36 and valve elements 38, 40 may be of any suitable construction well known in the art, a detailed description thereof will be omitted for purposes of conciseness of description.

Disposed directly below the piston 32 is a separating means in the form of a partition member, generally designated by the numeral 42. The partition member 42 may be of various constructions, such as a floating piston or a relatively deformable diaphragm or the like, with the partition member 42 extending entirely across the chamber 14 and separating the same into an upper fluid chamber 44 and a lower gas chamber 46. As previously mentioned, the chamber 44 is adapted to be filled with a damping fluid which cooperates with the valve elements 38, 40 in damping reciprocal movement of the piston rod 22 and piston 32. The gas chamber 46 is adaptably provided with a preselected quantity of a suitable compressible gas, such as nitrogen or the like, and resists downward movement or downward deformation of the partition means 42 as will occur when the unit 10 undergoes a compression stroke wherein the piston 32 and piston rod 22 moves downwardly within the chamber 14. The aforesaid downward movement of the partition means 42 or deformation thereof results from the fact that as the piston rod 22 moves into the fluid chamber 44, the damping fluid normally contained therein must be displaced in order to accommodate for the volume of the piston rod 22. Thus, the partition means 42 will move downwardly a preselected amount or will deform in a preselected manner sufficient to accommodate for the increased volume of the piston rod 22 which moves into the fluid chamber 44 during such a compression stroke. At the end of the stroke, the piston 32 and piston rod 22 will move upwardly within the chamber 44 and the partition member 42 will move upwardly or will assume its normal configuration under the influence of the compressed gas within the chamber 46, as will be apparent to those skilled in the art.

In normal operation of the leveling unit 10, said unit is adapted to be operatively associated with a leveling system such as that representatively depicted in FIG. 7 and generally designated by the numeral 48. As shown in FIG. 7, the leveling unit 10 is communicable via a suitable conduit 50 with a suitable fluid pump 52. As shown in FIG. 1, the conduit 50 may be connected to the enclosure 12 so as to communicate with the fluid chamber 44 at a position above the piston 32. The pump 52 may be of any suitable construction, such as is well known in the art, and is communicable with a suitable fluid reservoir 54 via a conduit 55. The pump 52 is adapted to be selectively energized upon actuation of a sensing switch 56 having an actuating element 57 and which is communicable with the pump 52 by means of a suitable conductor 58. In accordance with the present invention, the switch 56 is adapted to sense relative changes in attitude between the sprung and unsprung portions of a vehicle, such as are representatively designated by the numerals 59 and 60, respectively, in FIG. 7. When an attitude change occurs, the switch 56 will effect energization of the pump 52 to either supply or remove fluid from the chamber 44 and thus change the pressure of the gas in the chamber 46 some predetermined amount, which will in turn determine the location at which the piston 32 and piston rod 22 are at an equilibrium position within the chamber 44. For example, at such time as a preselected change in attitude occurs between the sprung and unsprung portions of the vehicle 59 and 60, such as when the vehicle is heavily loaded, the switch 56 will be actuated to effect energization of the pump 52, resulting in the pump 52 supplying additional damping fluid to the unit 10. This, of course, will cause the pressure of the gas in the chamber 46 to increase and hence the piston 32 and piston rod 22 will reach equilibrium at a higher position within the chamber 44, with the result that the vehicle sprung portion will be oriented in a preselected level attitude. Conversely, in the event the vehicle body were, for some reason, lightened, the switch 56 would again be actuated to effect energization of the pump 52 to pump damping fluid away from the unit 10 to the associated reservoir 54. This would reduce the pressure of the gas in the chamber 46 so that the piston 32 and piston rod 22 would be at equilibrium at a preselected lower position to again orient the sprung portion of the vehicle in a level position.

FIG. 8 illustrates another embodiment of a typical leveling system which is integrated with leveling vehicle normally operating ancillary hydraulic servo devices, accessories and the like. The hydraulic circuit is shown as being connected via a conduit $C_1$ to the switch 56 which is in turn connected to the reservoir 54 through conduit $C_2$. The reservoir 54 and pump 52 are connected via conduit $C_3$ and are respectively connected to the hydraulic circuit through conduits $C_4$ and $C_5$. In this installation the switch 56 functions to the hydraulic circuit of the associated the flow of fluid between the circuit and the strut 10, and between the strut 10 and the reservoir 54, depending on the attitude of the sprung portion of the vehicle as will be appreciated by those skilled in the art.

FIG. 6 illustrates a leveling unit 10' which is substantially identical in construction and operation to the aforedescribed unit 10 and hence all analogous components thereof are designated by like numerals. The primary difference between the units 10 and 10' resides in the fact that the piston rod 22 of the unit 10' is formed with a longitudinally extending central passage 62 through which damping fluid may be communicated to and from the associated pump, such as the pump 52, thus obviating the connection of the conduit 50 directly with the wall of the enclosure 12.

Referring now to FIG. 5, a leveling unit 10'' is shown as being closely analogous to the aforedescribed unit 10, with the similar components being designated by like numerals, with the exception that the unit 10'' is provided with a second enclosure, generally designated by the numeral 64. Enclosure 64 is provided with the aforementioned separating means 42 which divides the interior of the enclosure 64 into an upper fluid compartment 44'' and a lower gas compartment 46''. The compartment 44'' is communicable with the compartment 44 of the associated enclosure 12 by means of suitable fluid fittings 66 and 68 and a conduit 70. The conduit 70 is in turn communicable via a suitable conduit 72 with the associated leveling system in the same manner as was the conduit 50 associated with the unit 10. With the arrangement shown in FIG. 5, the enclosure 64 may be located remote from the unit 10'' and may, for certain types of installations, be operatively associated with two different units 10'', such as might be the case when two of the units 10'' were mounted between the axle of a vehicle and the associated frame thereof, with the enclosure 64 thus serving to house a single gas chamber 46'' for a pair of the units 10''.

For certain types of installations, it may be desirable to provide the leveling unit with two different fluid chambers, such as is shown in the vehicle leveling unit 10''' depicted in FIG. 3. As illustrated, the unit 10''' is provided with a second partition means, generally designated by the numeral 74, which may be and preferably is identical in construction and operation to the associated partition means 42 with the separating means 74 being located therebelow and defining therewith the associated gas chamber 46. The area below the separating means 74 defines a second fluid chamber 76 which is intended to be communicable via the conduit 50 with the associated leveling system.

With reference to FIG. 2, the piston rod 22 may, for certain types of installations, be somewhat larger in diameter than that shown in FIG. 1 and may be provided with a longitudinally extending internal passage or compartment 78, the upper end of which may be closed with a suitable closure member 80. The passage 78 is communicable with the fluid to compartment 44, and the upper end of the passage 78 is provided with a separating means 82 analogous to the aforementioned second separating means 74 of the unit 10'''. Accordingly, the unit 10'''' shown in FIG. 2 has a second gas chamber 83 which is separated from the fluid chamber 44 by means of the aforementioned separating means 82.

FIG. 4 illustrates yet another embodiment of the present invention wherein a leveling unit 10''''' which is similar in construction and operation with regard to the various units heretofore illustrated, includes a second enclosure 84 that is communicable via fluid fittings 86 and 88 and a conduit 90 with the gas chamber 46 of the unit 10'''''. The interior of the enclosure 84 is provided with a second separating means 92 that divides the interior of the enclosure 84 into an upper gas chamber 94 and a lower fluid chamber 96, the latter of which is communicable with the associated vehicle leveling system via the conduit 50.

It is contemplated that any of the aforedescribed units may be provided with a suitable restricted orifice, such as the orifice 98 shown in FIG. 1, which would function to selectively control the flow of hydraulic damping fluid between the unit and the associated vehicle leveling system in order to assure against premature actuation of the leveling system, i.e. pump 52, during a rolling movement of the vehicle.

It will be seen from the foregoing that the present invention provides a novel leveling unit which is intended to replace the normal shock absorber on an associated vehicle. This is particularly true with regard to McPherson type suspension systems. Toward this end, reference is made to FIG. 9 where a typical installation of a McPherson type shock absorber unit is depicted and which is adapted to be replaced by a leveling strut constructed in accordance with the principles of the present invention. More particularly, a McPherson shock absorber unit is shown as being generally designated by the numeral 200 and having an exterior reserve tube 202, a pressure cylinder 204 and a fluid reservoir 206 provided therebetween. An elongated piston rod 208 is reciprocally mounted within the pressure cylinder 204 and carries a conventional piston assembly 210 on the lower end thereof. The upper end of the piston rod 208 is formed with an attachment end portion 212 that is adapted to be secured to the associated vehicle body 214 by a suitable threaded nut or the like 216 and by an associated anti-friction bearing assembly 217 which permits relative rotational movement of the unit 200 with respect to the vehicle body 214. The lower end of the unit 200 is adapted to be operatively supported by means of a conventional strut receiving housing 218 which is formed with a generally cup-shaped recess 220 adapted to nestingly receive the lower end of the unit 200. The housing 218 is fixedly secured directly to the wheel spindle 222 upon which the associated vehicle wheel 224 is operatively mounted, with the housing 218 serving to operatively connect the wheel spindle 222 to the associated steering linkage 226 and the trailing arm or the like 228. A spring seat is carried upon the reserve tube 202 and is adapted to operatively support the lower end of the helical suspension spring 232 that extends generally co-axially of the unit 200, with the upper end of the spring 232 being received within an upper spring seat 234 that is operatively mounted on the upper end of the piston rod 208.

As previously mentioned, the unit 200 may be replaced by one of the leveling struts 10 of the present invention, whereby the associated vehicle is provided with a selectively adjustable leveling system. This is in part based upon the fact that such McPherson shock absorber units require a relatively large cross section piston rod in order to transmit and withstand axial and lateral loading. The design of the present invention will be seen to lend itself with particular advantage, since the piston rods 22 have relatively large cross sectional sizes. FIG. 10 illustrates a typical installation wherein a leveling strut 10 in accordance with the present invention has replaced a McPherson type shock absorber unit such as that shown in FIG. 9 and designated by the numeral 2000. It will be seen that the lower end of the strut 10 is adapted to be nestingly received within the recess 220 of the housing 218 and that the upper end of the piston rod 22 is connected directly to the vehicle body as shown in FIG. 9, or the like, with attachment means 216 and 238. Additionally, in most applications an important feature of the applicant's leveling strut design will be seen from the fact that radially displacement is permitted between the piston rod 22 and associated housing or enclosure 12 without adversely affecting the operation of the unit so that the conventional stem mounting may be used for the interconnection of the piston rod 22 to the body 214, thus obviating the need for the bearing assembly 217 shown in FIG. 9. Additionally, in most applications of the leveling strut 10, the need for the associated coil spring 232 is obviated, with the result that the ancillary expense of the spring 232 and spring seats 230 and 234 will be eliminated when a leveling strut 10 of the present invention is substituted for the shock absorber in a McPherson-type application. For most front suspension systems, there is no need for a leveling system and the units 10 can be used as a simple spring, including the shock absorber, without varying means for the oil quantity.

It is, of course, contemplated that the various units 10 shown herein may be installed independently or in pairs, located at either the front or rear of the vehicle. As previously mentioned, the various gas chambers associated with the units 10 may be operatively connected to two or more of the units such that a single chamber operates for multiple units. Such might be the case with the unit 10''' shown in FIG. 5.

It will also be seen that the present invention, by virtue of its simple design, will have a long and effective life, as well as universality of application.

While it will be apparent that the preferred embodiments illustrated herein are well calculated to fulfill the objects above stated, it will be appreciated that the present invention is susceptible to modification, variation change without departing from the scope of the invention.

We claim:
1. In a leveling system for a vehicle having sprung and unsprung portions,
  at least one level strut comprising a cylinder connected at one end to one of the vehicle portions,
  a piston reciprocally mounted within said cylinder,
  a piston rod connected to said piston and projecting from one end of said cylinder and adapted for connection to the other of the vehicle portions,
  a quantity of damping fluid within said cylinder for damping reciprocal movement of said piston,
  means defining a gas chamber containing a quantity of a compressible gas,
  first separating means for separating said gas from said damping fluid, means for varying the pressure of said gas to control the relative attitude between the sprung and unsprung vehicle portions, and second separating means separating said quantity of gas from said last mentioned means.

2. The invention as set forth in claim 1 wherein at least one of said separating means comprises a movable partition member exposed on one side to said damping fluid and on the opposite side to said gas.

3. The invention as set forth in claim 1 which includes means for communicating damping fluid away from said cylinder for controlling the pressure of said gas.

4. The invention as set forth in claim 3 which includes fluid conduit means communicable with the wall of said cylinder for communicating damping fluid to and from said cylinder.

5. The invention as set forth in claim 4 wherein said conduit means is communicable with said cylinder at the same end of said cylinder from which said piston rod extends.

6. The invention as set forth in claim 1 which includes first and second quantities of damping fluid and wherein said first separating means comprises a movable partition member interposed between one of said quantities of damping fluid and said gas and wherein said second separating means comprises a movable partition member interposed between said gas and said second quantity of fluid.

7. The invention as set forth in claim 1 which includes first and second enclosure means, one of which is provided by said cylinder, wherein said piston is reciprocally mounted in one of said enclosure means and wherein one of said separating means is movably disposed in the other of said enclosures.

8. The invention as set forth in claim 7 wherein at least a portion of said quantity of gas is disposed in said other enclosure and adapted to be compressed by movement of said one separating means therein.

9. The invention as set forth in claim 7 wherein one of said separating means is disposed in one of said enclosures and the other of said separating means is disposed in the other of said enclosures, which includes first and second quantities of gas located in said first and second enclosures, respectively, and means defining a gas passage communicating said quantities of gas.

10. The invention as set forth in claim 8 which includes conduit means communicating said first and second enclosures and means communicable with said conduit means for communicating damping fluid to and from said enclosures.

11. The invention as set forth in claim 9 wherein said first enclosure has said piston reciprocally disposed therein, wherein said first separating means is disposed within said first enclosure and separates the damping fluid therein from one of said quantities of gas, wherein the other of said separating means is disposed in the other of said enclosures and separates said second quantity of gas from a preselected quantity of damping fluid, which includes conduit means communicating said first and second quantities of gas and means for communicating damping fluid to and from said second quantity of damping fluid in said second enclosure for varying the attitude between said vehicle portions.

12. In the method of controlling the attitude between the sprung and unsprung portions of a vehicle by means of a combination leveling strut and shock absorber having a piston reciprocable within a cylinder having quantities of damping fluid and gas therein, the steps which include, controlling the flow of damping fluid between the opposite sides of the piston during reciprocal movement thereof within the cylinder, providing first separating means within the cylinder between said damping fluid and said quantity of gas, moving the separating means with pressurizing means so as to compress the gas in response to predetermined change in attitude between the vehicle portions, selectively changing the pressure of the gas and thereby controlling the relative attitudes between the vehicle portion, and providing second separating means between said quantity of gas and the pressurizing means.

13. The method as set forth in claim 12 which includes the step of changing the pressure of the quantity of gas by varying the volume of the damping fluid within the cylinder.

14. The method as set forth in claim 13 which includes the step of separating the quantities of damping fluid and gas by means of a relatively movable partition member.

15. The method as set forth in claim 13 which includes the step of removing damping fluid from said cylinder on the opposite side of said piston from the separating means.

16. The method as set forth in claim 12 which includes the step of defining first and second compartments with said first and second separating means and providing each of said compartments with a preselected quantity of damping fluid and which includes the step of removing damping fluid from the compartment other than that within which the piston is disposed.

17. The method as set forth in claim 12 which includes the step of providing one of the partition means interiorly of a piston rod operatively connecting the piston with one of the vehicle portions and defining with said one partition means a gas chamber interiorly of the piston rod.

18. The method as set forth in claim 12 which includes the step of providing first and second enclosures, one of which is provided by the cylinder, which includes the additional step of locating the first and second partition means one within each of the enclosures, and which includes the additional step of communicating quantities of gas between the two enclosures.

19. The method as set forth in claim 13 which includes the step of providing the separating means in an enclosure other than that within which the piston is reciprocally mounted and which includes the additional step of selectively communicating damping fluid between said cylinder and said additional enclosure.

20. In combination in a vehicle having sprung and unsprung portions, at least one wheel supporting spindle, and a shock absorber support means associated with the spindle, a leveling strut comprising a housing adapted to be supported by said support means, a piston reciprocally mounted within said cylinder, a piston rod connected to said piston and projecting from one end of said cylinder and adapted for connection to the sprung portions of the vehicle, a quantity of damping fluid within said cylinder for damping reciprocal movement of said piston, means defining a gas chamber containing a quantity of a compressible gas, first separating means for separating said gas from said damping fluid, means for varying the pressure of said gas to control the relative attitude between the sprung and unsprung vehicle portions, and second separating means separating said quantity of gas from said last mentioned means.

21. The invention as set forth in claim 20 wherein at least one of said separating means comprises a movable partition member exposed on one side to said damping fluid and on the opposite side to said gas.

22. The invention as set forth in claim 20 which includes means for communicating damping fluid away from said cylinder for controlling the pressure of said gas.

23. The invention as set forth in claim 22 which includes fluid conduit means communicable with the wall of said cylinder for communicating damping fluid to and from said cylinder.

24. The invention as set forth in claim 23 wherein said conduit means is communicable with said cylinder at the same end of said cylinder from which said piston rod extends.

25. The invention as set forth in claim 20 wherein said first separating means comprises a movable partition member interposed between one of said quantities of damping fluid and said gas and wherein said second separating means comprises a movable partition member interposed between said gas and said second quantity of fluid.

26. The invention as set forth in claim 20 which includes first and second quantities of gas, said first separating means being interposed between said first quantity of gas and said quantity of damping fluid and said second separating means being interposed between said quantity of damping fluid and second quantity of gas.

27. The invention as set forth in claim 20 which includes first and second enclosure means, one of which is provided by said cylinder, wherein said piston is reciprocally mounted in one of said enclosure means and said separating means is movably disposed in the other of said enclosures.

28. The invention as set forth in claim 27 wherein said quantity of gas is disposed in sand other enclosure and adapted to be compressed by movement of said separating means therein.

29. The invention as set forth in claim 27 wherein one of said separating means is disposed in one of said enclosures and the other of said separating means is disposed in the other of said enclosures, which includes first and second quantities of gas located in said first and second enclosures, respectively, and means defining a gas passage communicating said quantities of gas.

30. The invention as set forth in claim 28 which includes conduit means communicating said first and second enclosures and means communicable with said conduit means for communicating damping fluid to and from said enclosure.

31. The invention as set forth in claim 29 wherein said first enclosure has said piston reciprocally disposed therein, wherein said first separating means is disposed within said first enclosure and separates the damping fluid therein from one of said quantities of gas, wherein the other of said separating means is disposed in the other of said enclosures and separates said second quantity of gas from a preselected quantity of damping fluid, which includes conduit means communicating said first and second quantities of gas and means for communicating damping fluid to and from said second quantity of damping fluid in said second enclosure for varying the attitude between said vehicle portions.

32. The invention as set forth in claim 20 which includes control means for selectively communicating damping fluid to and from said cylinder in response to preselected changes in attitude between said vehicle portions.

* * * * *